United States Patent
Fischer et al.

(10) Patent No.: US 6,618,070 B2
(45) Date of Patent: Sep. 9, 2003

(54) MULTI-BEAM SCANNING APPARATUS

(75) Inventors: Jörg-Achim Fischer, Laboe (DE); Thomas Jacobsen, Kiel (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/023,156

(22) Filed: Dec. 17, 2001

(65) Prior Publication Data

US 2002/0085085 A1 Jul. 4, 2002

(30) Foreign Application Priority Data

Dec. 15, 2000 (DE) ......................................... 100 62 683

(51) Int. Cl.⁷ .................................................. B41J 2/47
(52) U.S. Cl. ...................................... 347/239; 347/255
(58) Field of Search ................................ 347/239, 241, 347/244, 255, 256, 258; 359/199, 226, 221, 251, 276, 285, 286, 305, 308

(56) References Cited

U.S. PATENT DOCUMENTS

| | | | |
|---|---|---|---|
| 4,444,470 A | 4/1984 | Ioka et al. | .................... 359/312 |
| 4,810,068 A | 3/1989 | Shimazu et al. | ............. 359/285 |
| 4,946,234 A * | 8/1990 | Sasada et al. | ................ 359/221 |
| 5,157,650 A | 10/1992 | Ozue et al. | ................... 369/111 |
| 5,739,939 A | 4/1998 | Merritt | ......................... 359/204 |
| 5,892,610 A * | 4/1999 | Rolfe et al. | .................. 359/198 |
| 5,923,359 A * | 7/1999 | Montgomery | ............... 347/255 |
| 6,052,216 A | 4/2000 | Rolfe et al. | .................. 359/285 |
| 6,288,831 B1 * | 9/2001 | Iizuka | ......................... 359/308 |

FOREIGN PATENT DOCUMENTS

| | | |
|---|---|---|
| DE | 39 12 208 A1 | 10/1989 |
| DE | 41 20 103 A1 | 1/1992 |
| EP | 0 762 721 B1 | 3/1997 |

* cited by examiner

*Primary Examiner*—Hai Pham
(74) *Attorney, Agent, or Firm*—Laurence A. Greenberg; Werner H. Stemer; Gregory L. Mayback

(57) ABSTRACT

A multi-beam scanning apparatus is provided for use with a recording medium that is located on an at least partially cylindrical inner bearing face of a recording device, in which the bearing face has a cylinder axis. The scanning apparatus includes a scanner unit for scanning the recording medium with at least one exposure beam. The scanner unit includes an acousto-optical element that is either an acousto-optical deflector or an acousto-optical modulator. The scanner unit includes a deflection element that is axially displaceable and rotatable relative to the cylinder axis of the bearing face. The acousto-optical element is mounted to rotate together with the deflection element about the cylinder axis.

22 Claims, 3 Drawing Sheets

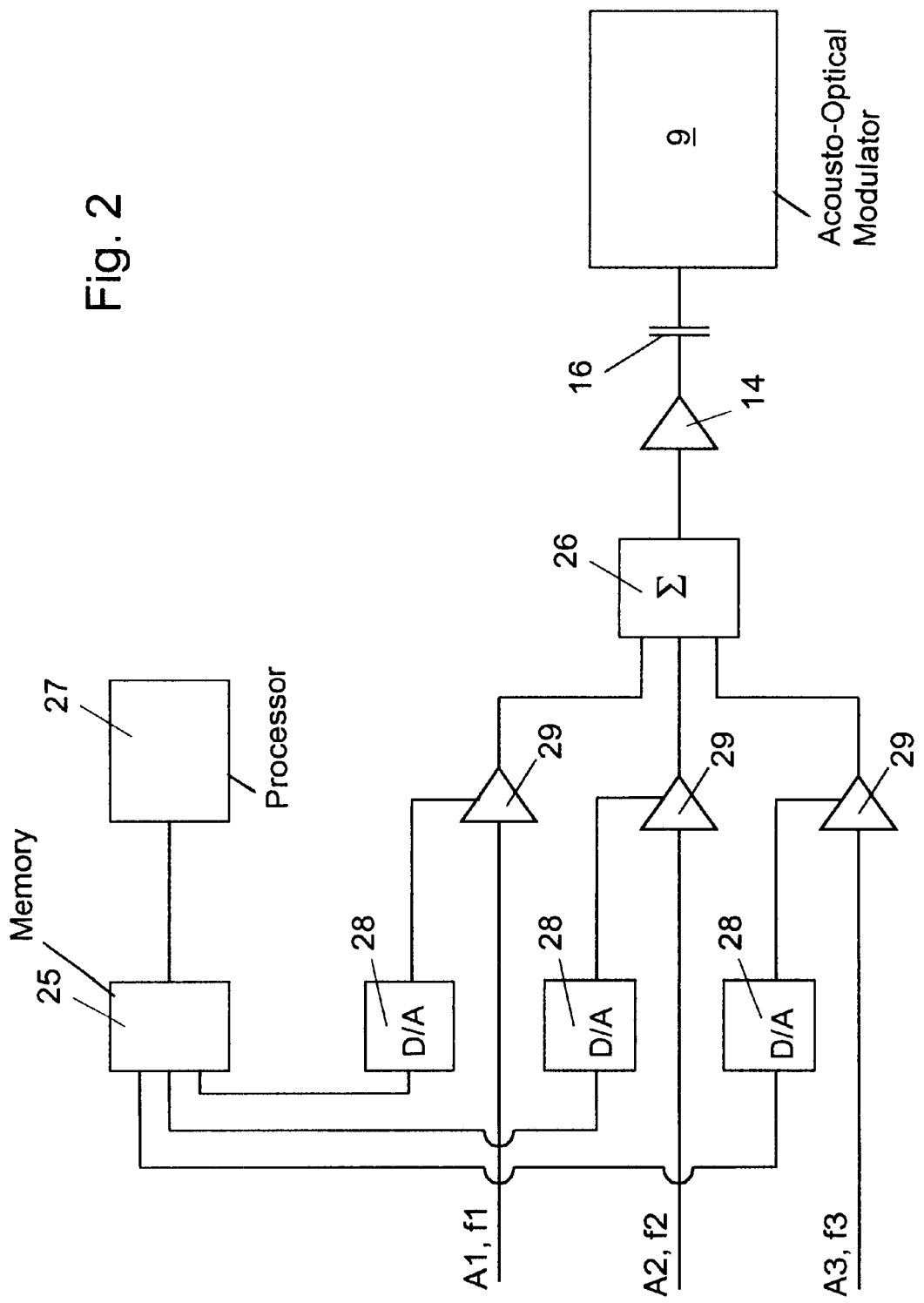

| Channel S1 | Channel S2 | Channel S3 |
|---|---|---|
| Off | Off | Off |
| Off | Off | On |
| Off | On | Off |
| Off | On | On |
| On | Off | Off |
| On | Off | On |
| On | On | Off |
| On | On | On |

FIG. 3a

| Channel S1 | Channel S2 | Channel S3 |
|---|---|---|
| 0 | 0 | 0 |
| 0 | 0 | B32 |
| 0 | B23 | 0 |
| 0 | B24 | B34 |
| B15 | 0 | 0 |
| B16 | 0 | B36 |
| B17 | B27 | 0 |
| B18 | B28 | B38 |

FIG. 3b

| Channel S1 | Channel S2 | Channel S3 |
|---|---|---|
| X | X | X |
| X | X | A32 |
| X | A23 | X |
| X | A24 | A34 |
| A15 | X | X |
| A16 | X | A36 |
| A17 | A27 | X |
| A18 | A28 | A38 |

FIG. 3c

MULTI-BEAM SCANNING APPARATUS

BACKGROUND OF THE INVENTION

Field of the Invention

A multi-beam scanning apparatus can be used with a recording device that has an internal cylindrical bearing face for receiving a recording medium. The multi-beam scanning go apparatus, in particular, can be used with an internal-drum exposure device. The multi-beam scanning apparatus includes a scanner unit for scanning the recording medium with at least one exposure beam. The scanner unit includes one acousto-optical deflector or modulator and one deflection element that is axially displaceable and rotatable relative to a cylinder axis of the bearing face. The deflection element is for deflecting the exposure beam emerging from the acousto-optical deflector or modulator. In the reproduction industry, internal-drum laser exposure devices serve to expose a photosensitive recording medium, spread over the inside of a cylindrical drum, line by line, using an intensity-modulated laser beam.

In U.S. Pat. No. 6,052,216, an internal-drum exposure device of the type defined at the outset has already been disclosed in which a single exposure beam, originating in a stationary laser light source, after passing through two likewise stationary acousto-optical modulators is deflected onto a deflection element in the form of an axially displaceable rotating mirror. From the mirror, the exposure beam is reflected onto a photosensitive medium on an inner drum surface of the exposure device. Since the optical axis of the exposure beam in such an arrangement must be located on the axis of rotation of the rotating mirror, if line-by-line exposure of the photosensitive medium to light is to be made possible, the exposure beam emerging from the acousto-optical modulators is an undiffracted zero-order beam of light.

That is, an exposure beam that is nonaxial relative to the pivot axis would, after reflection from the mirror, not move in the circumferential direction over the bearing face and thus would not permit line-by-line scanning of the medium perpendicular to the axis.

From U.S. Pat. No. 4,444,470, in an optical multi-beam modulation and deflection device, it is also already known, to increase the recording speed, using an acousto-optical deflector disposed in a stationary fashion between a laser light source and a rotating mirror. A number of exposure beams located side by side in the same plane are generated and are then reflected, using a rotating mirror, onto a photosensitive recording medium on the outer circumference of a drum. Since not all of the exposure beams can be located on the same axis, a polygonal mirror must be used to reflect the exposure beams; its rotating axis forms an angle with the optical axis of the undiffracted laser beam so that the plane of the deflected exposure beams is perpendicular to the axis of the drum. However, such an arrangement requires a relatively large amount of space, and it can be employed only in external-drum exposure devices, but not in internal-drum exposure devices where the drum axis coincides with the pivot axis of the rotating deflection element.

From Published German Application DE 41 20 103 A1, it is in fact already known per se, in a housing that rotates about the drum axis and that is axially displaceable relative to the inner drum in an internal-drum exposure device, to provide a deflection element and additionally to provide a light source that rotates together with the deflection element about the drum axis. The light source can be formed by a multi-channel laser diode line, from which the exposure beams emerge spaced apart from the drum axis and strike the deflection element. Since the spacings of the individual laser diodes in commercially available laser diode lines are relatively great, however, the laser diode line and the deflection element must be positioned at an angle relative to one another, by rotating one of the two relative to the other about a pivot axis, in order to achieve linear conjugation, that is, a partial overlap of the pixels created on the recording medium. If the exposure beams from all of the laser diodes of the laser diode line are to strike the recording medium, despite the positioning of the diodes in a plane perpendicular to the pivot axis, the individual laser diodes must be triggered with a time lag in accordance with the axial motion of the deflection element relative to the recording medium, which involves additional effort and expense for calculating the time lag and calibrating the exposure device.

SUMMARY OF THE INVENTION

It is accordingly an object of the invention to provide a multi-beam scanning apparatus which overcomes the above-mentioned disadvantages of the prior art apparatus of this general type.

In particular, it is an object of the invention to provide a multi-beam scanning apparatus of the type defined at the outset, to enable line-by-line scanning of the recording medium with one or more exposure beams originating in an arbitrary laser light source, which do not strike the deflection element along the cylinder axis of the bearing face and whose spacings are variable.

With the foregoing and other objects in view there is provided, in accordance with the invention, a multi-beam scanning apparatus for use with a recording medium located on an at least partially cylindrical inner bearing face of a recording device, in which the bearing face has a cylinder axis. The scanning apparatus includes a scanner unit for scanning the recording medium with at least one exposure beam. The scanner unit includes an acousto-optical element that is either an acousto-optical deflector or an acousto-optical modulator. The scanner unit includes a deflection element that is axially displaceable and rotatable relative to the cylinder axis of the bearing face. The acousto-optical element is mounted to rotate together with the deflection element about the cylinder axis.

In accordance with an added feature of the invention, the acousto-optical element is simultaneously actuated with voltage signals at different frequencies on a plurality of channels to split a laser beam, which is delivered from outside the acousto-optical element into the acousto-optical element, into a series of exposure beams.

In accordance with an additional feature of the invention, the frequencies of the voltage signals are each modulated differently to independently vary intensities of the exposure beams.

In accordance with another feature of the invention, a high-frequency driver is provided for triggering the acousto-optical element with the voltage signals.

In accordance with a further feature of the invention, the driver receives a video input signal, and the driver modulates the carrier frequency of each one of the voltage signals in accordance with the received video input signal.

In accordance with a further added feature of the invention, devices are provided for transmitting the voltage signals from the driver to the acousto-optical element. The devices either capacitively transmit the voltage signals or inductively transmit the voltage signals. The driver is not rotating.

In accordance with a further additional feature of the invention, there is provided, a non-rotating laser light source feeding a laser beam along the cylinder axis into the acousto-optical element.

In accordance with yet an added feature of the invention, a laser light source generates a laser beam having a beam path, and a device is disposed in the beam path upstream of the acousto-optical element. The acousto-optical element has an optical entry face, and the device deflects the laser beam to the optical entry face at a defined angle.

In accordance with yet an additional feature of the invention, the device includes an optical wedge.

In accordance with yet another feature of the invention, the device rotates together with the acousto-optical element.

In accordance with yet a further feature of the invention, the device includes an optical wedge that has a light entry face oriented toward the laser light source. The optical wedge has a light exit face oriented toward the acousto-optical element. Downstream of the light entry face of the optical wedge, the laser beam diverges away from the axis. Downstream of the light exit face of the optical wedge, the laser beam extends toward the axis such that the laser beam intersects the axis inside the acousto-optical element.

In accordance with still an added feature of the invention, there is provided, a laser light source for generating a laser beam, the acousto-optical element has an optical entry face, and the laser beam forms a Bragg angle with a normal to the optical entry face of the acousto-optical element.

In accordance with still an additional feature of the invention, there is provided, a laser light source for generating a laser beam having a beam path, and an optical system, which is disposed in the beam path upstream of the acousto-optical element, for generating a constriction in the laser beam inside the acousto-optical element.

In accordance with still another feature of the invention, the exposure beam has a beam path; the deflection element is disposed in the beam path downstream of the acousto-optical element; and the deflection element deflects the exposure beam essentially radially outward to the recording medium.

In accordance with an added feature of the invention, the deflection element includes a device selected from the group consisting of a mirror, a prism, holographic gratings, diffractive gratings, and a concave mirror.

In accordance with an additional feature of the invention, there is provided, a projection lens system. The exposure beam of the scanner unit has a beam path, and the projection lens system is disposed in the beam path of the exposure beam downstream of the acousto-optical element.

In accordance with another feature of the invention, the projection lens system is a telecentric projection lens system.

In accordance with a further feature of the invention, correction devices are provided. The acousto-optical element is simultaneously actuated with voltage signals at different frequencies on a plurality of channels to split a laser beam, which is delivered into the acousto-optical element from outside the acousto-optical element, into a series of exposure beams. The correction devices are for correcting an amplitude of each one of the voltage signals to generate a plurality of exposure beams having identical light intensities.

In accordance with a further added feature of the invention, there is provided, a memory having a matrix of correction values $A_{ij}$ for each of M×N possible turn-on states of the plurality (n) of the channels, where N=n and M=$2^n$. Devices are provided for varying the amplitude of each one of the voltage signals with a respective one of the correction values $A_{ij}$ that are stored in the memory.

With the foregoing and other objects in view there is provided, in accordance with the invention, an internal-drum laser exposure device that includes a recording device having an at least partially cylindrical inner bearing face for a recording medium. The bearing face has a cylinder axis. The internal-drum laser exposure device has a multi-beam scanning apparatus including a scanner unit for scanning the recording medium with at least one exposure beam. The scanner unit includes an acousto-optical element that is either an acousto-optical deflector or an acousto-optical modulator. The scanner unit includes a deflection element that is axially displaceable and rotatable relative to the cylinder axis of the bearing face. The acousto-optical element is mounted to rotate together with the deflection element about the cylinder axis.

By the inventive combination of characteristics, a split beam, which is diffracted out of the cylinder axis inside the acousto-optical deflector or modulator and which is used as an exposure beam, maintains its orientation relative to a scanner unit mirror or prism rotating about the cylinder axis as the pivot axis, and thus relative to the recording medium. This is in contrast to an arrangement in which the mirror or prism rotates relative to a stationary acousto-optical deflector or modulator.

A preferred feature of the invention provides that the acousto-optical deflector or modulator can be acted upon simultaneously over a plurality of channels with voltage signals at different frequencies, in order to split the laser beam into a number of exposure beams. The number of exposure beams can be varied by means of the number of frequencies that are applied simultaneously.

Unlike the prior art Published German Patent Application DE 41 20 103 A, in the invention, the spacings between the pixels of the individual exposure beams on the recording medium, or their overlap, is adjusted by the distances between the frequencies that are applied, so that no transit time corrections are required for orienting the plane, which is defined downstream of the deflection element by the exposure beams, perpendicular to the pivot axis.

The voltage signals supplied by a driver, because of their different frequencies, create a plurality of variously markedly diffracted 1st order split beams in the acousto-optical deflector or modulator, which are then used to expose the recording medium to light. To furnish intensity-modulated exposure beams, the high-frequency voltage signals not only have different carrier frequencies, but these carrier frequencies are also modulated differently, specifically in each case as a function of a corresponding video input signal of the driver. These modulated high-frequency voltage signals, serving to trigger the acousto-optical deflector or modulator, are preferably generated by a nonrotating high-frequency driver and are transmitted capacitively or inductively into a rotor, in which the acousto-optical deflector or modulator is expediently integrated with the deflection element.

By the simultaneous subjection of the acousto-optical deflector or modulator to a plurality of voltage signals of different carrier frequencies, the laser beam arriving in the acousto-optical deflector or modulator is split into a number of 1st order split beams corresponding to the number of different frequencies, and these split beams after emerging from the acousto-optical deflector or modulator are used as exposure beams for scanning the recording medium, while the zero-order split beam is blanked out. For scanning the recording medium, which is equidistant from the cylinder axis, the exposure beams are deflected radially using the deflection element and are focused on the recording medium using a preferably telecentric projection lens system. The projection lens system used is preferably embodied such that by axially displacing one or more optical elements contained in the lens system, the spot size of the exposure beams on the recording medium is changed.

Another preferred feature of the invention provides that the laser beam from a stationary laser light source is fed along the cylinder axis of the bearing face of the recording medium and thus along the pivot axis of the deflection element and the acousto-optical deflector or modulator into the rotor. The laser beam is then preferably deflected to one side in such a way that it forms a constant angle with an optical entry face of the acousto-optical deflector or modulator, namely the Bragg angle, which is dependent on the wavelength of the laser light, on the mean ultrasound frequency of the acousto-optical deflector or modulator, and on the acoustical speed. At this angle, the laser beam in the 1st order undergoes a maximum intensity of diffraction.

To attain this, it is proposed that an optical wedge be used for laterally deflecting the laser beam. The optical wedge rotates together with the acousto-optical deflector or modulator. The optical wedge has a light entry face that is oriented toward the light source, and a light exit face that is oriented toward the acousto-optical deflector or modulator. The dimensions of the optical wedge and the orientation of the light entry face and the light exit face are expediently selected such that the laser beam is deflected away from the pivot axis between the light entry face and the light exit face, and downstream of the light exit face, the laser beam extends toward the cylinder axis or pivot axis again in such a way that the laser beam intersects this axis inside the acousto-optical deflector or modulator and strikes the optical entry face thereof, preferably at the Bragg angle.

An optical system is expediently provided in the beam path upstream of the acousto-optical deflector or modulator. The purpose of the optical system is to form a constriction in the laser beam at its point of intersection with the pivot axis, inside the acousto-optical modulator.

Other features which are considered as characteristic for the invention are set forth in the appended claims.

Although the invention is illustrated and described herein as embodied in a multi-beam scanning apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a diagram that is provided for explaining amplitude correction of high-frequency voltage signals of a high-frequency driver of a three-channel scanning apparatus;

FIG. 3a shows matrixes of combinations of ON states;

FIG. 3b shows measured, uncorrected light levels as a function of the ON states; and FIG. 3c shows correction values for the amplitudes of the high-frequency voltage signals of FIG. 2.

DESCRIPTION OF THE PREFERRED EMBODIMENTS

Figure 1:
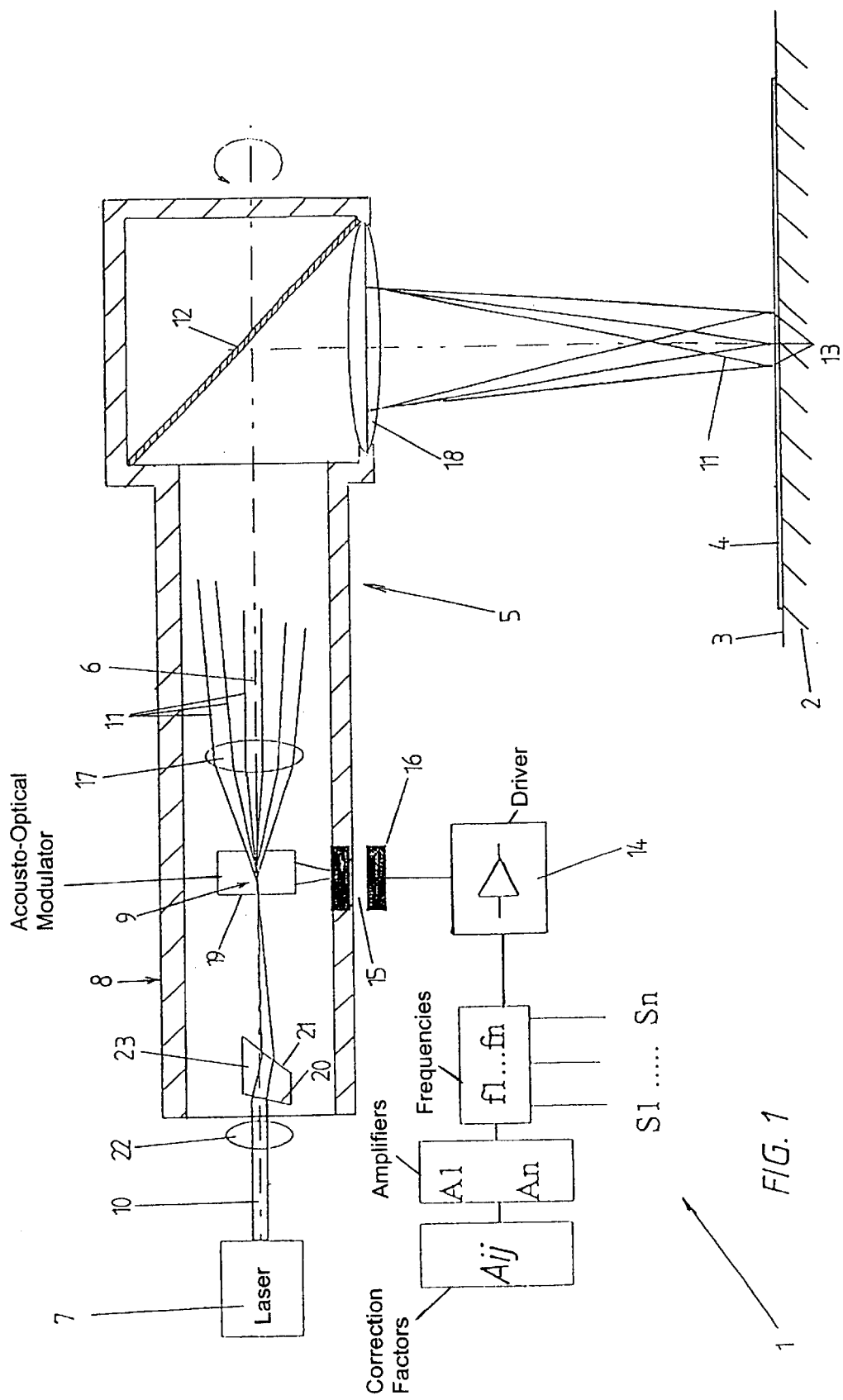
FIG. 1 is a schematic view of the essential parts of a multi-beam scanning apparatus of an internal-drum exposure device.

Referring now to the figures of the drawing in detail and first, particularly, to FIG. 1 thereof, there is shown a portion of an internal-drum exposure device (1). Like conventional internal-drum exposure devices, the internal-drum exposure device (1) has an external housing (2), whose inside forms a partly cylindrical bearing face (3) for a printing plate or other photosensitive recording medium (4) in the form of a web or a sheet. A scanner unit (5) is located inside the external housing (2) of the exposure device (1). The scanner unit (5) is supported displaceably relative to the housing (2) in the axial direction of a cylinder axis (6) of the partly cylindrical bearing face (3).

The scanner unit (5) substantially includes a laser light source (7) and a rotor (8) that is connected to a rotary drive means (not shown) and that is rotatable about the cylinder axis (6). The hollow-cylindrical rotor (8) includes, among other elements, an acousto-optical modulator (AOM) (9), in which a laser beam (10) originating in the laser light source (7) is split into individual intensity- or brightness-modulated exposure beams (11). The hollow-cylindrical rotor (8) also includes a deflection element (12), by which the modulated exposure beams (11) are deflected essentially radially to the axis (6), so that the photosensitive recording medium (4) on the bearing face (3) can be scanned line by line and exposed to light in the circumferential direction of the bearing face. To increase the recording speed, the recording medium (4) is simultaneously exposed in the circumferential direction of the bearing face (3) along a number of lines (13) corresponding to the number of exposure beams (11). The feeding takes place transversely to the line direction, that is, in the direction of the axis (6), by means of an axial displacement of the scanner unit (5) relative to the external housing (2).

The AOM (9) has a configuration corresponding to known acousto-optical modulators and includes a crystal that is transparent to the laser beam (10). The AOM (9) also includes a piezoelectric converter, which outputs ultrasonic waves into the crystal when an external alternating voltage is applied to the converter. The laser beam (10), directed from outside onto the AOM (9), is diffracted on passing through the crystal by the ultrasonic waves generated by the converter. The extent of diffraction inside the AOM (9), or in other words, the angle at which a diffracted 1st order light beam used thereafter as the exposure beam (11) emerges from the crystal, is dependent on the frequency of the applied voltage. If according to the invention n voltage signals at different frequencies (f1 . . . fn) are fed simultaneously to the AOM (9) from a high-frequency driver (14) over n channels (S1 . . . Sn), then the laser beam is split into a number of 1st order light beams corresponding to the number (n) of different frequencies (f1 . . . fn), which each emerge from the AOM (9) at different angles and after exiting are directed, in the form of a cluster of exposure beams (11), to the recording medium (4). The intensity or brightness of each of these exposure beams (11) is varied separately from the intensity or brightness of the other exposure beams (11), because the high-frequency voltage signals output at different carrier frequencies have been modulated beforehand in the driver (14) with different video input signals.

In FIG. 1, S1 . . . Sn represent the n channels to be transmitted; f1 . . . fn represent the different frequencies of the 1 . . . n channels; A1 . . . An represent the amplitudes of the voltage signals of the 1 . . . n channels; and Aij represent correction factors for correcting the amplitudes of the voltage signals on the 1 . . . n channels. Correspondingly, for a three-channel scanning apparatus used for explanatory purposes in FIG. 2, the amplitudes and frequencies of the voltage signals of the three channels are identified by A1, A2 and A3 and f1, f2 and f3, respectively, and in FIG. 3, the three channels to be transmitted are designated S1, S2 and S3.

Since the channels involved affect one another because of intermodulation effects and/or depletion, and since the various channels, because of electrical adaptation and because of Bragg conditions that are not absolutely optimal for each channel, are not subject to exactly the same diffraction efficiency, the amplitudes of the voltage signals of the channels are corrected so that the diffracted 1st order light beams of each channel will have the same light intensity under the same conditions.

To that end, first the light intensities or light levels of the 1st order light beams are ascertained for all of the possible combinations of ON states and OFF states of all of the channels S1 . . . Sn. FIG. 3a shows an M×N matrix illustrating all of the possible combinations of ON states and OFF states for the exemplary embodiment with three channels S1, S2, S3. The number N of columns of the matrix is equal to the number n of channels S1 . . . Sn, while the number M of the lines of the matrix is equal to the number of possible combinations and is accordingly $2^n$. FIG. 3b shows the associated M×N matrix of the measured light intensities as a function of the various ON states, which for a turned-off channel are equal to zero and for a turned-on channel, depending on the ON state of the other two channels, have a value Bij. From this M×N matrix of values, the smallest value $Bij_{min}$ is ascertained and defined as 100%, while the other values are divided by the value $Bij_{min}$, in order to determine an associated correction factor Aij for each ON state. For a channel that has been turned off, no correction factor needs to be ascertained. The correction factors Aij are then placed in an M×N correction value matrix, as shown in FIG. 3c. The correction value matrix is stored in the form of digital values in a memory (25), such as a RAM (Random Access Memory) or ROM (Read Only Memory), that is disposed outside the rotor (5).

The voltage signals of the three channels S1, S2 and S3, with amplitudes A1, A2 and A3 and frequencies f1, f2, f3, respectively, are delivered to the driver (14) via a summation element (26) so that they can be transmitted to the AOM (9). Before the voltage signals are delivered to the driver 14, however, they are corrected using the correction values Aij that are stored in memory, as a function of the various ON states of the three channels S1, S2, S3. To that end, the ON states of each channel S1, S2 and S3 are ascertained on an ongoing basis. A processor (27), as a function of the ascertained combination of ON states, calls up the applicable correction factor Aij at the appropriate address in the memory (25).

As shown in FIG. 2, a respective digital/analog converter (28) is provided for each channel and is disposed downstream of the memory (25). The digital/analog converters (28) convert the correction factors that are called up from the memory (25) into analog values and the analog values are then delivered to an associated amplifier (29). The amplitudes A1, A2 and A3 of the voltage signal of this channel S1, S2 and S3 can be reduced in accordance with the correction factor Aij stored in memory, so that under the same conditions, the same light intensities of the 1st order light beams can be attained, regardless of the ON states.

Since the high-frequency driver (14) used to trigger the AOM (9) is not mounted on the rotor (8), the corrected high-frequency voltage signals are transmitted by a transmission device (16), inductively or preferably capacitively, past the air gap (15) surrounding the rotor (8) to the rotor (8) and to the AOM (9).

The deflection element (12) substantially includes a plane mirror, mounted on the rotor (8) at an angle of preferably about 45° to the pivot axis (6). However, instead of the plane mirror (12), a prism, holographic or diffractive gratings, or a concave mirror can be used to deflect the exposure beam cluster emerging from the AOM (9) and to orient the exposure beam essentially radially relative to the axis (6) so that the exposure beams (11) strike the recording medium (4) essentially vertically.

The rotor (8) also supports a projection lens system that is disposed in the beam path downstream of the AOM (9). The projection lens system includes a plurality of lenses (17, 18) disposed upstream and optionally partly downstream as well of the mirror (12). The lenses (17, 18) focus the diffracted, divergent exposure beams (11) onto the recording medium (4). The projection lens system (17, 18) is preferably a telecentric optical system and can include one or more lenses (17) that are adjustable in the axial direction, in order to vary the spot size of the exposure points generated on the recording medium (4). The projection lens system (17, 18) can include additional optical elements (not shown) for blanking out the zero-order split beams that have passed without diffraction through the AOM (9).

An optical wedge (23) is also mounted on the rotor (8) in the beam path between the light source (2) and the AOM (9). The optical wedge (23) assures that the unsplit laser beam (10), that is fed into the hollow-cylindrical rotor (8) from the light source (2) and that is fed along the axis (6), enters an optical entry face (19) of the AOM (9) at the Bragg angle to achieve a maximum diffraction efficiency in the 1st order. To that end, the laser beam is first refracted at an entry face (20) of the optical wedge (23) in such a way that this beam is deflected away from the axis (6) inside the optical wedge (23). Next, at an exit face (21) of the optical wedge (23), the laser beam (10) is refracted again and directed toward the axis (6) again in such a way that it intersects this axis inside the AOM (9) or at its optical entry face (19), preferably at the Bragg angle.

An optical system with one or more lenses (22) is disposed between the light source (2) and the AOM (9) and is disposed on and/or in front of the rotor (8). The optical system focuses the laser beam (10), which arrives from the laser light source (2), inside the AOM (9) and on the axis (6) in order to create a constriction in the beam (10) there.

We claim:

1. A multi-beam scanning apparatus for use with a recording medium located on an at least partially cylindrical inner bearing face of a recording device, in which the bearing face has a cylinder axis, the scanning apparatus, comprising:

a scanner unit for scanning the recording medium with at least one exposure beam;

said scanner unit including an acousto-optical element selected from the group consisting of an acousto-optical deflector and an acousto-optical modulator;

said scanner unit including a deflection element that is axially displaceable and rotatable relative to the cylinder axis of the bearing face; and said acousto-optical element being mounted to rotate together with said deflection element about the cylinder axis.

2. The multi-beam scanning apparatus according to claim 1, wherein said acousto-optical element is simultaneously actuated with voltage signals at different frequencies on a plurality of channels to split a laser beam, which is delivered from outside said acousto-optical element into said acousto-optical element, into a series of exposure beams.

3. The multi-beam scanning apparatus according to claim 2, wherein the frequencies of the voltage signals are each modulated differently to independently vary intensities of the exposure beams.

4. The multi-beam scanning apparatus according to claim 3, comprising a high-frequency driver for triggering said acousto-optical element with the voltage signals.

5. The multi-beam scanning apparatus according to claim 2, comprising a high-frequency driver for triggering said acousto-optical element with the voltage signals.

6. The multi-beam scanning apparatus according to claim 5, wherein said driver receives a video input signal, and said driver modulates the carrier frequency of each one of the voltage signals in accordance with the received video input signal.

7. The multi-beam scanning apparatus according to claim 6, comprising:
   devices for transmitting the voltage signals from said driver to said acousto-optical element;
   said devices transmitting the voltage signals in a manner selected from the group consisting of capacitively transmitting the voltage signals and inductively transmitting the voltage signals; and
   said driver not rotating.

8. The multi-beam scanning apparatus according to claim 1, comprising:
   a non-rotating laser light source feeding a laser beam along the cylinder axis into said acousto-optical element.

9. The multi-beam scanning apparatus according to claim 1, comprising:
   a laser light source generating a laser beam having a beam path; and
   a device disposed in the beam path upstream of said acousto-optical element;
   said acousto-optical element having an optical entry face; and
   said device deflecting the laser beam to said optical entry face at a defined angle.

10. The multi-beam scanning apparatus according to claim 9, wherein said device includes an optical wedge.

11. The multi-beam scanning apparatus according to claim 9, wherein said device rotates together with said acousto-optical element.

12. The multi-beam scanning apparatus according to claim 11, wherein said device includes an optical wedge.

13. The multi-beam scanning apparatus according to claim 9, wherein:
   said device includes an optical wedge that has a light entry face oriented toward said laser light source;
   said optical wedge has a light exit face oriented toward said acousto-optical element;
   downstream of said light entry face of said optical wedge, the laser beam diverges away from the axis; and
   downstream of said light exit face of said optical wedge, the laser beam extends toward the axis such that the laser beam intersects the axis inside said acousto-optical element.

14. The multi-beam scanning apparatus according to claim 1, comprising:
   a laser light source generating a laser beam;
   said acousto-optical element having an optical entry face;
   the laser beam forming a Bragg angle with a normal to said optical entry face of said acousto-optical element.

15. The multi-beam scanning apparatus according to claim 1, comprising:
   a laser light source generating a laser beam having a beam path; and
   an optical system, disposed in the beam path upstream of said acousto-optical element, for generating a constriction in the laser beam inside said acousto-optical element.

16. The multi-beam scanning apparatus according to claim 1, wherein:
   said exposure beam has a beam path;
   said deflection element is disposed in the beam path downstream of said acousto-optical element; and
   said deflection element deflects the exposure beam essentially radially outward to the recording medium.

17. The multi-beam scanning apparatus according to claim 1, wherein said deflection element includes a device selected from the group consisting of a mirror, a prism, holographic gratings, diffractive gratings, and a concave mirror.

18. The multi-beam scanning apparatus according to claim 1, comprising:
   a projection lens system;
   the exposure beam having a beam path; and
   said projection lens system disposed in the beam path of the exposure beam downstream of said acousto-optical element.

19. The multi-beam scanning apparatus according to claim 18, wherein said projection lens system is a telecentric projection lens system.

20. The multi-beam scanning apparatus according to claim 1, comprising:
   correction devices;
   said acousto-optical element being simultaneously actuated with voltage signals at different frequencies on a plurality of channels to split a laser beam, which is delivered into said acousto-optical element from outside said acousto-optical element, into a series of exposure beams;
   said correction devices being for correcting an amplitude of each one of the voltage signals to generate a plurality of exposure beams having identical light intensities.

21. The multi-beam scanning apparatus according to claim 20, comprising:
   a memory having a matrix of correction values $A_{ij}$ for each of M×N possible turn-on states of the plurality (n) of the channels, where $N=n$ and $M=2^n$; and
   devices for varying the amplitude of each one of the voltage signals with one of the correction values $A_{ij}$ that are stored in said memory.

22. An internal-drum laser exposure device, comprising:
   a recording device having an at least partially cylindrical inner bearing face for a recording medium, the bearing face having a cylinder axis; and
   a multi-beam scanning apparatus including:
      a scanner unit for scanning the recording medium with at least one exposure beam, said scanner unit including an acousto-optical element selected from the group consisting of an acousto-optical deflector and an acousto-optical modulator, said scanner unit including a deflection element that is axially displaceable and rotatable relative to the cylinder axis of the bearing face, and said acousto-optical element being mounted to rotate together with said deflection element about the cylinder axis.

* * * * *